(12) United States Patent
Tousignant et al.

(10) Patent No.: US 8,533,275 B2
(45) Date of Patent: Sep. 10, 2013

(54) SYNCHRONIZING CONVERSATION STRUCTURES IN WEB-BASED EMAIL SYSTEMS

(75) Inventors: Patrick Tousignant, Bellevue, WA (US); Manish Garg, Redmond, WA (US); Sridhar Sundararaman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 88 days.

(21) Appl. No.: 13/213,320

(22) Filed: Aug. 19, 2011

(65) Prior Publication Data

US 2013/0046836 A1 Feb. 21, 2013

(51) Int. Cl.
*G06F 15/16* (2006.01)

(52) U.S. Cl.
USPC ........... 709/206; 455/412.2; 707/776; 706/47

(58) Field of Classification Search
USPC ......................................................... 709/206
See application file for complete search history.

(56) References Cited

U.S. PATENT DOCUMENTS

| | | | |
|---|---|---|---|
| 6,330,589 B1 | 12/2001 | Kennedy | |
| 6,952,708 B2 | 10/2005 | Thomas et al. | |
| 7,107,314 B2 | 9/2006 | Cox | |
| 7,149,813 B2 | 12/2006 | Flanagin et al. | |
| 7,743,019 B2 | 6/2010 | Shah et al. | |
| 7,792,792 B2 | 9/2010 | Witriol et al. | |
| 2007/0226265 A1* | 9/2007 | Nichols et al. | 707/200 |
| 2009/0083441 A1 | 3/2009 | Clark et al. | |
| 2009/0094337 A1 | 4/2009 | Dias | |
| 2009/0319911 A1 | 12/2009 | McCann et al. | |
| 2010/0100590 A1 | 4/2010 | Palay et al. | |
| 2010/0153335 A1 | 6/2010 | Esteve et al. | |
| 2010/0306154 A1* | 12/2010 | Poray et al. | 706/47 |
| 2012/0149342 A1* | 6/2012 | Cohen et al. | 455/412.2 |

OTHER PUBLICATIONS

Fu, et al., "Synchronizability of Conversations Among Web Services", Retrieved at <<http://www.cs.ucsb.edu/research/tech_reports/reports/2005-28.pdf>>, Proceedings of IEEE Transactions on Software Engineering, vol. 31, Issue 12, Dec. 2005, pp. 1-19.
"International Search Report", Mail Date: Feb. 27, 2013, Application No. PCT/US2012/049678, Filed date: Aug. 5, 2012, pp. 9.

* cited by examiner

*Primary Examiner* — David Lazaro
*Assistant Examiner* — Mahran Abu Roumi
(74) *Attorney, Agent, or Firm* — Turk IP Law, LLC

(57) ABSTRACT

Web-based email systems are enabled to synchronize conversations and conversation properties. Conversations are enumerated to new clients providing folder-specific and global conversation information. After receiving the initial conversation information, clients maintain a conversation state, which is used in updating clients from a web service store through a conversation synchronization command employing an internal application programming interface within the email service.

17 Claims, 7 Drawing Sheets

SYNCHRONIZING CONVERSATION STRUCTURES IN WEB-BASED EMAIL SYSTEMS

BACKGROUND

Email is a method of exchanging digital messages from an author to one or more recipients. Modern email operates across the Internet or other computer networks based on a store-and-forward model. Email servers accept, forward, deliver and store messages. Neither the users nor their computers need to be online simultaneously; they need connect only briefly, typically to an email server, for as long as it takes to send or receive messages. Email messages can include textual, graphical, audio, video, and comparable content.

While other forms of networked communications are proliferating, email is still the prominent one among business and personal users. In an organizational environment, users may exchange emails with a variety of other users on a number of topics such as projects, discussion topics, themes, etc. In typical email applications, users' mailboxes are commonly arranged in several folders. Some folders are built-in; others may be created by the users. Email client applications with limited storage traditionally synchronize emails stored in a subset of the folders and only some of the emails of those folders (based on time received). However, "conversations", which are groupings of emails identified by a common attribute (e.g., subject, thread topic, participants, etc.), can be spread across different folders. For example, some emails belonging to a conversation may be in the incoming mail folder, others in sent mail folder, yet others in user created folder(s). Thus, a traditional email client application may be able to keep up-to-date status information on conversations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling synchronization of conversations and conversation properties in a web-based email system. According to some embodiments, conversations may be enumerated to new clients providing folder-specific and global conversation information. After receiving the initial conversation information, clients may maintain a conversation state, which may be used in updating clients from a web service store through a conversation synchronization command.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
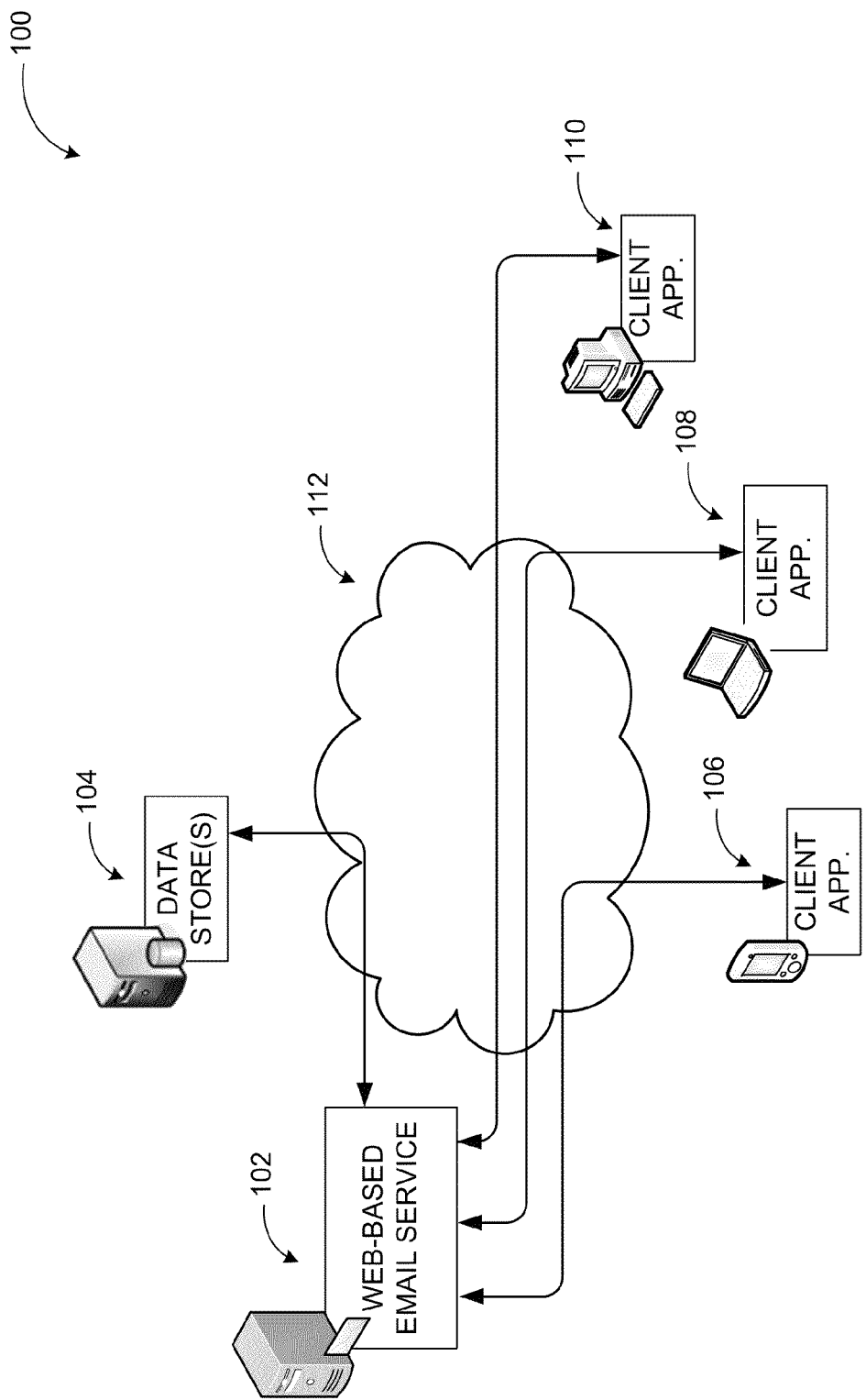
FIG. 1 illustrates an example networked system for synchronizing conversation structures in web-based email according to some embodiments.

As briefly described above, folder-specific and global conversation information may be synchronized with email client applications in a web-based mail system employing a conversation state. In the following detailed description, references are made to the accompanying drawings that form a part hereof, and in which are shown by way of illustrating specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing web-based email services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example networked system for synchronizing conversation structures in web-based email according to some embodiments. Example components shown in diagram 100 are for illustration purposes. Embodiments may be implemented in various local, networked, and similar computing environments employing a variety of computing devices and systems.

According to some embodiments, a web service command as part of the web service 102 facilitating email exchange allows a client (e.g., 106, 108, 110) to synchronize conversations, which have at least one email within a specified folder and time window. The web service 102 may report changes to conversations rather than emails and efficiently enumerate existing conversations such that new clients joining the service receive all conversation data. Folder-specific and global information about each conversation such as number of read/unread/flagged/responded emails (in a specific folder or total) may be reported. The web service 102 may also return a synchronization state to the client allowing it to control the synchronization session. Web service 102 and clients 106-110 may communicate over one or more networks 112 and email (and conversation) related data may be stored in one or more data stores 104 as illustrated in diagram 100.

A web service according to embodiments may track changes to conversation objects in a server database and report the structure of any changed conversation to the client. This may include aggregated data like the subject, recipients, flags, importance, categories, etc. The reported data may also include a list of emails (e.g., identified by an "itemId") that are part of a conversation.

To efficiently populate the existing content of a folder, when the client connects for the first time, a query mechanism may be used where the last synchronized conversation is sought on each request. This approach maintains the synchronization state small and is an efficient operation for the server.

Figure 2:
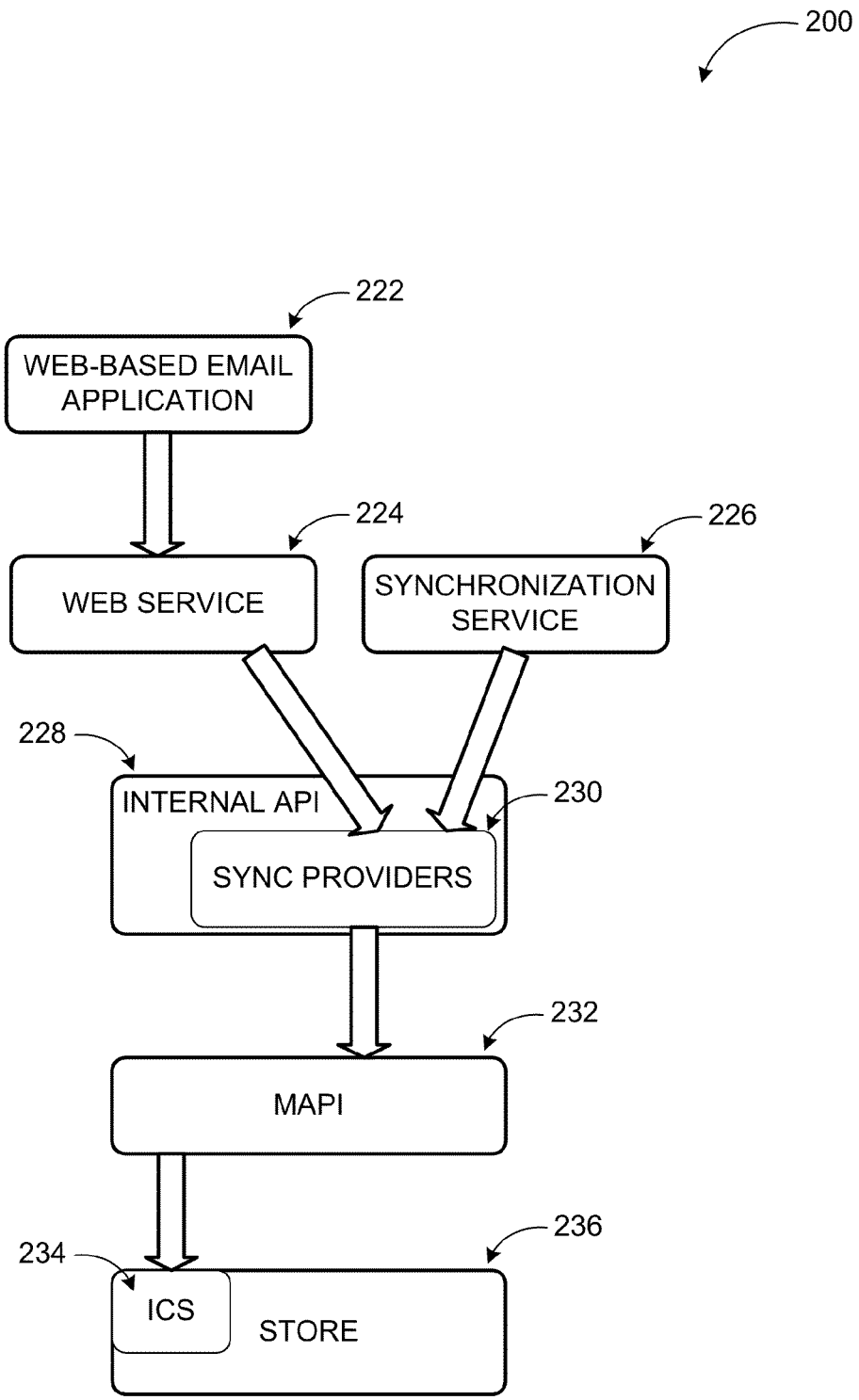
FIG. 2 illustrates major components of a system according to embodiments.

FIG. 2 illustrates major components of a system according to embodiments. A system enabling synchronization of conversations within an email service may include any number of components. Those illustrated in diagram 200 are for example purposes only and do not constitute a limitation on embodiments.

The example components in a system according to embodiments include web-based email application 222 communicating with web service 224 (for example, Exchange® by Microsoft Corp. of Redmond, Wash.), and synchronization service 226. Web service 224 and synchronization service 226 may interact with synchronization providers 230 within an internal application programming interface (API) 228 and through a messaging API (MAPI) 232 with the Incremental Change Synchronization (ICS) 234 of a data store 236 storing emails, conversations, and relevant metadata.

An example for synchronization service 226 is Exchange ActiveSync® (EAS) by Microsoft Corp. of Redmond, Wash., which is an XML-based protocol that communicates over Hypertext Transport Protocol (HTTP) designed for the synchronization of email, contacts, calendar, tasks and notes from a messaging server to a mobile device. The protocol may also provide mobile device management and policy controls. The synchronization service 226 may provide a conversation view that puts email messages in a view connected by several attributes including a message ID and the email subject, notes synchronizing, the ability to look up the availability (free/busy status) of a contact (from their calendar), a nickname cache in which the names of common used contacts are shared, the ability to set a server side rule to move messages in a conversation, etc.

The web service 224 and the web-based email application 222 may communicate with the data store 236 through the internal API 228 with the MAPI 232 acting as middle tier. MAPI 232 is a messaging architecture and a Component Object Model (COM) based API that allows client programs to become (e-mail) messaging-enabled, -aware, or -based by calling MAPI subsystem routines that interface with certain messaging servers. MAPI allows complete control over the messaging system on the client computer, creation and management of messages, management of the client mailbox, service providers, and so on. MAPI includes facilities to access message transports, message stores, and directories. ICS 234 is part of the web service that allows MAPI clients to enumerate changes that have occurred in a given folder. ICS 234 may be envisioned as a change tracking module.

In an example scenario, the web-based email application 222 may send a conversation synchronization request to web service 224. In response, the web service 224 may call ICS 234 on a conversation view of a folder and determine the list of conversations that have changed. For each received conversation ID, the client may send a GetConversationItems request with the conversation state blob for that conversation. The web service 224 may read the item list from the conversation view of a folder, compare with the data in the conversation state and return the item properties and bodies that have changed. A more detailed process is explained below.

The web-based email application 222 may start a synchronization session by sending a synchronize conversation request. The request may include a list of folder IDs to synchronize (e.g., in priority order), a time window to synchronize, a number of changes to return, and/or a mega synchronization state blob (empty on first synchronization). The response may include an updated mega synchronization state blob, a flag indicating if there are more changes, the changed or added conversations that participate in at least one of the folders requested, and the deleted conversations. The data per conversation may include a conversation ID, the message identifier (MID) of the conversation object (to correlate deletes), the aggregate statistics for some of the folders, and/or the aggregate global statistics. Each of the deleted conversations may include the MID of the conversation object and a folder ID that the message is being deleted from.

Upon receiving the response the web-based email application 222 may iterate through the added/changed conversations, iterate through the deleted conversations, and Delete conversations for which the last received time is past the time window desired. The iteration through the added/changed conversations may include finding the conversation in the local database using the conversation ID (if not found, it may create a new conversation), updating the global statistics, updating the folder statistics (for those folders with statistics available), removing any folder statistics for folders that are not within the folder IDs (FIDs), and adding conversation ID to list of conversations to "get". Iteration through the deleted conversations may include finding the conversation in the local database using the MID (if not found, skipping to next deleted conversation), removing any folder statistics for the folder this deleted conversation was in, and adding conversation ID to list of conversations to "get".

For each conversation ID accumulated during synchronization session, the web-based email application 222 may send GetConversationItems requests with the following arguments: (1) a conversation ID, (2) a CState (conversation state) received in the last GetConversationItems for this conversation, and (3) the item IDs+change key+read flag change key for each message in the conversation. If the response is "conversation not found", the web-based email application may delete the conversation from its database. If the conversation is found, the response may include the message properties for the items that have changed, the body parts of messages affected by the changes, the new CState for this conversation, and the item IDs+change key+read flag change key for each message in the conversation. The web-based email application may store the response in the conversation. If any item ID is in the request and is not in the response, that message may be deleted.

The web service 224 may receive a conversation synchronization request with the arguments the list of folder IDs to synchronize, a time window to synchronize, a number of changes to return, and/or a mega synchronization state blob (empty on first sync). The response may include an updated synchronization state blob, a flag indicating if there are more changes, the changed or added conversations that participate in at least one of the folders requested, and/or the deleted conversations. The data per conversation may include the conversation ID, the MID of the conversation object (to correlate deletes), the aggregate statistics for some of the folders, and/or the aggregate global statistics. The deleted conversations may include the MID of the conversation object, the folder ID of the folder the conversation is being deleted from.

The web service 224 may compute the response by performing the following steps:
1) Split the mega synchronization state blob into the synchronization state for each folder to synchronize
2) For each folder to synchronize (in the order requested):
   a. If the synchronization state for this folder does not exist
      i. Get a "catch-up" synchronization state from ICS and package it in the mega synchronization state.
      ii. Store the current time as the last received time (LRT) watermark
   b. If the synchronization state does exist, enumerate changes by calling ICS using "conversation mode" and "new-to-old" on the requested folder.
      i. Skip any change where LRT is before the requested time window
      ii. For adds and changes: receive the conversation ID, the MID, the aggregate statistics (folder and global)
      iii. For deletes: receive the MID of the conversation object
3) For each folder to synchronize (in order of newest LRT watermark):
   a. If the LRT watermark is passed the requested time window, skip to next folder
   b. Query for conversations with LRT less than the LRT watermark (in descending LRT order). When a LRT is reached that is greater than the requested time window (or the end of the results), store the lowest LRT that has been detected in the synchronization state.

Whenever the number of changes requested by the client is reached, the system may break out of the above loops.

The web service 224 may receive a GetConversationItems request with arguments (1) the conversation ID, (2) the CState received in the last GetConversationItems for this conversation, (3) the item IDs+change key+read flag change key for each message in the conversation. If the response is "conversation not found", the web-based email application 222 may delete the conversation from its database. If the conversation is found, the response may include the message properties for the items that have changed, the body parts of messages affected by the changes, the new CState for this conversation, and the item IDs+change key+read flag change key for each message in the conversation.

The web service may 224 call ICS 234 with the arguments (1) the previous synchronization state, (2) the folder ID, (3) a new flag that indicates "conversation mode", (4) the "new-to-old" flag, and (5) the list of extra properties to return for adds and changes. The ICS 234 may return the conversations added/changed, the conversations "soft-deleted" (no longer in the folder being synchronized), and the new synchronization state. The conversations added/changed may include a conversation ID, a MID of the conversation object (used to correlate future deletes), the folder-specific conversation statistics, and the global conversation statistics. The "soft-deleted" conversations may also include the MID of the conversation object. The ICS mode may enumerate changes to any conversation object with at least one message in that folder. Since the web service may be performing an ICS enumeration for each folder requested by the client, a synchronization state per folder may be stored in data store 236.

Figure 3:
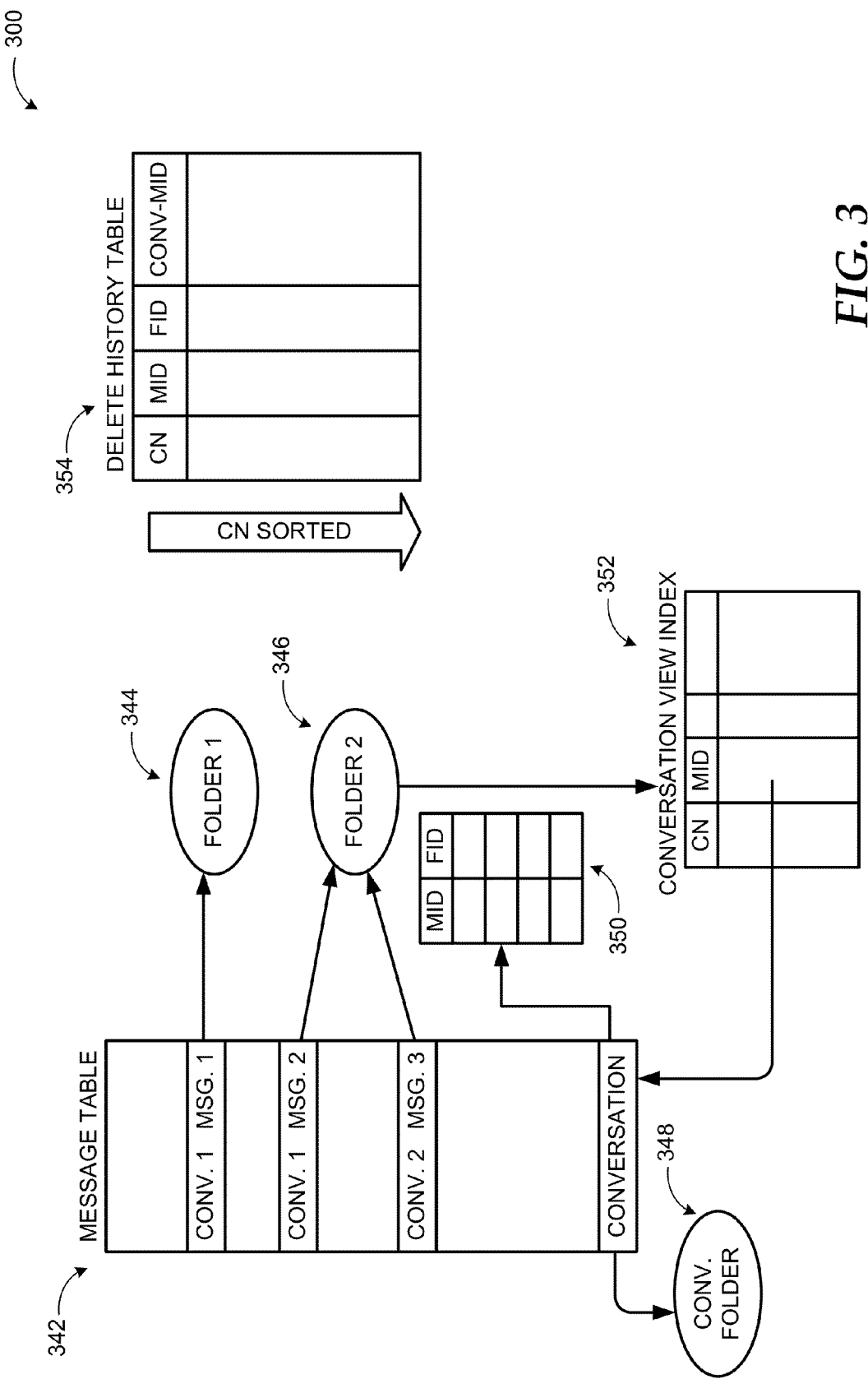
FIG. 3 illustrates example store tables and indices in a system for synchronizing conversation structures.

FIG. 3 illustrates example store tables and indices in a system for synchronizing conversation structures. A system according to embodiments may employ one or more tables to keep track of conversation states, message states, etc. Some example tables are conceptually illustrated in diagram 300.

As mentioned above, the ICS mode may enumerate changes to any conversation object with at least one message in a folder. For folders (e.g., 344, 346) being synchronized a conversation view index 352 sorted by change number (CN) may be maintained. In some embodiments, the data store may maintain several of these indexes per folder. The status of messages may be maintained in a conversation view of a folder 342, where the messages are recorded along with their conversation attributes. Conversation information may be stored in a conversation folder 348. As discussed above, MIDs and FIDs (350) may be used by the system at various stages of synchronization.

Since the web service may be performing an ICS enumeration for each folder requested by the client, a synchronization state may be stored per folder. If the size of the synchronization state is too big, data may be removed by using a Delete History Table 354. As a message is deleted, it may be appended to Delete History Table 354 with a new CN. At synchronization time, any entry in the Delete History Table 354 that has not been processed may be included in the deleted set of the response.

Figure 4:
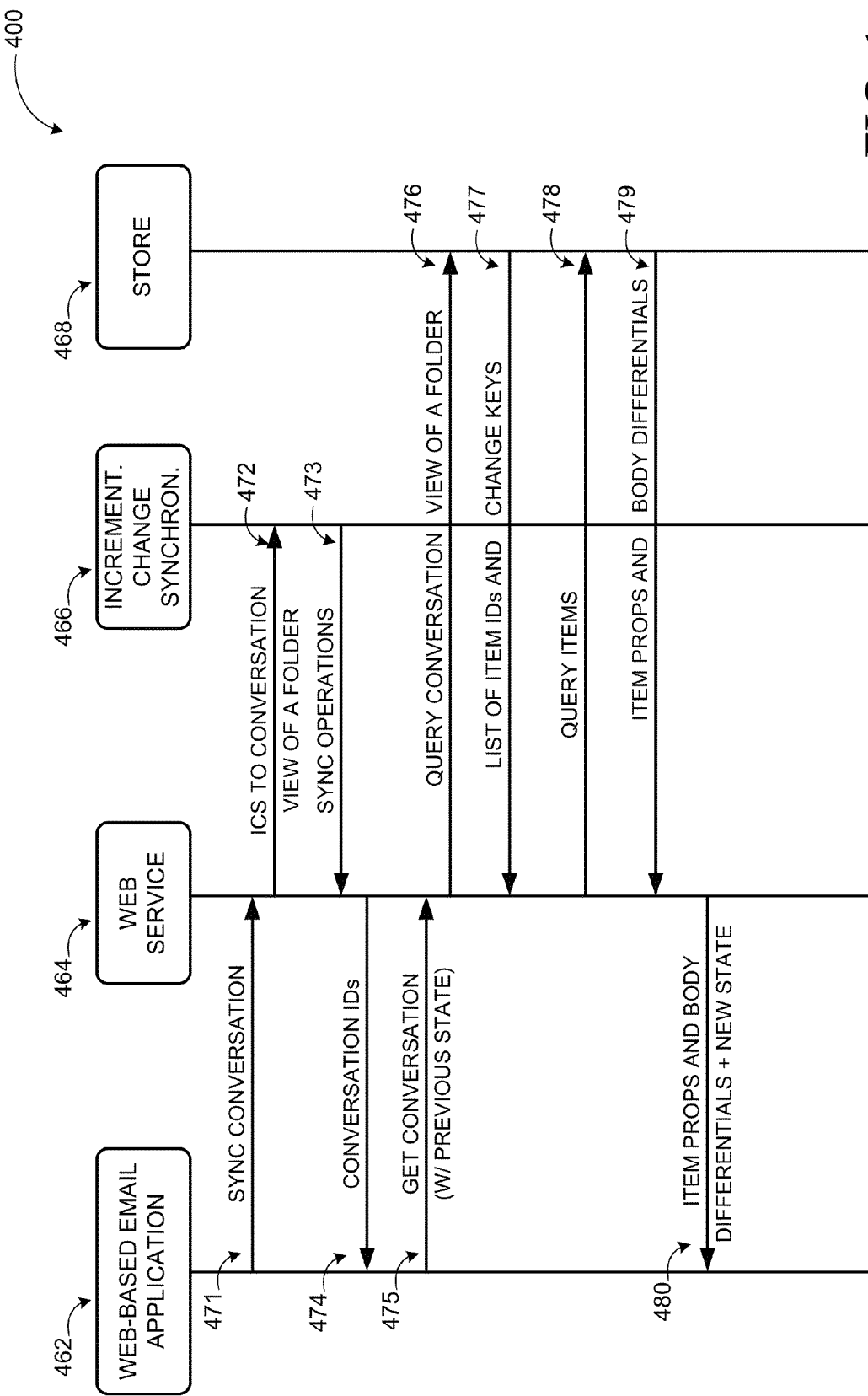
FIG. 4 is an action diagram illustrating example interactions between major components of a system according to embodiments.

FIG. 4 is an action diagram illustrating example interactions between major components of a system according to embodiments. While diagram 400 displays interactions between web-based email application 462, web service 464, ICS 466, and store 468, a system according to embodiments may include additional components with additional interactions.

In an example scenario, web-based email application 462 may start the process with a conversation synchronization request (471), upon which the web service 464 may read on the conversation view of a folder (472) through ICS 466. ICS 466 may return synchronization operations (473) to web service 464, which may provide conversation IDs (474) to web-based email application 462. In response, web-based email application 462 may send a GetConversationItems request with previous state (475) to web service 464. Web service 464 may submit a query on the conversation view of a folder (476) based on the conversation IDs received from the web-based email application to store 468 through ICS 466.

In response to the query, web service 464 may receive a list of items and change keys (477) from the store 468 and query the items (478). The store 468 may return item props and body differentials (479) to the web service 464, which may send item props, body differentials, and the new state (480) to the web-based email application 462. A system according to embodiments may also employ fewer or additional interactions to synchronize conversations among clients.

The example embodiments in FIG. 1 through 4 are shown with specific components and configurations. Embodiments are not limited to systems according to these example configurations. Synchronizing email conversation structures in web-based systems may be implemented in configurations employing fewer or additional components in business applications. Furthermore, the example architectures, systems and components shown in FIG. 1 through 4 and their attributes may be implemented in a similar manner with other components using the principles described herein.

Figure 5:
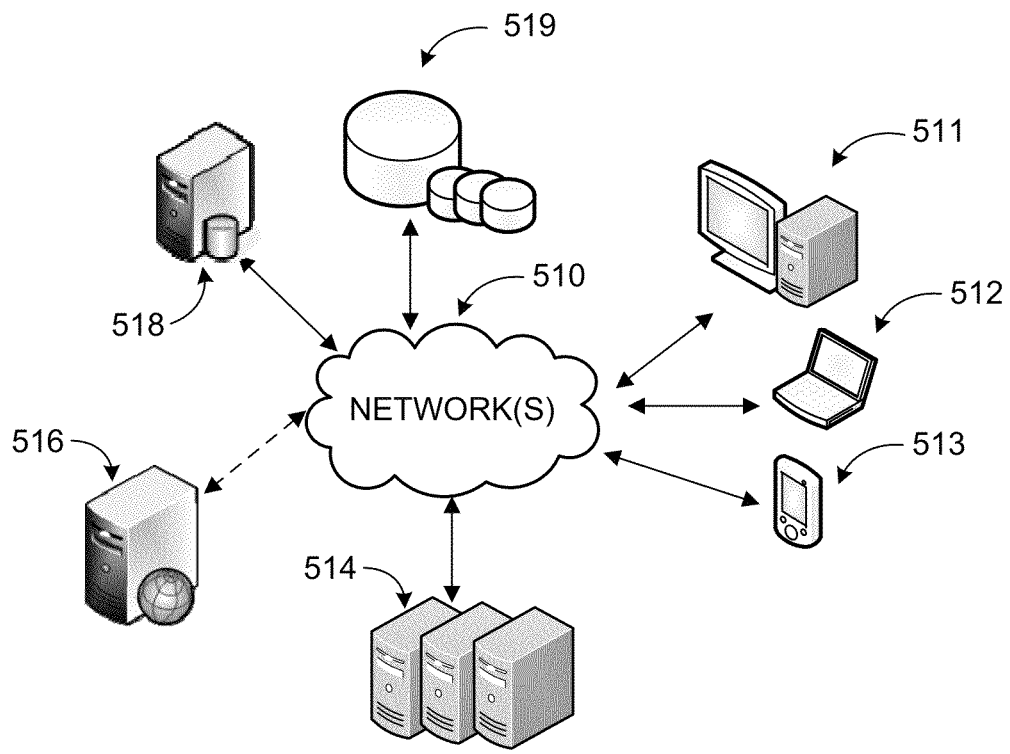
FIG. 5 is a networked environment, where a system according to embodiments may be implemented.

FIG. 5 is a networked environment, where a system according to embodiments may be implemented. A web-based email service with conversation synchronization may be facilitated through one or more applications executed over one or more servers 514 or a single server (e.g. web server) 516 such as a hosted service. The applications facilitating email exchanges and conversation synchronization may communicate with client applications such as browsers on individual computing devices such as a smart phone 513, a laptop computer 512, or desktop computer 511 ('client devices') through network(s) 510.

As discussed above, a web-based email service may enable client applications on client devices 511-513 and similar devices exchange emails while synchronizing conversations across the client applications even if synchronization is restricted to a subset of folders. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a web-based email service with conversation synchronization. Furthermore, the networked environments discussed in FIG. 5 are for illustration purposes only. Embodiments are not limited to the example applications, modules, or processes.

Figure 6:
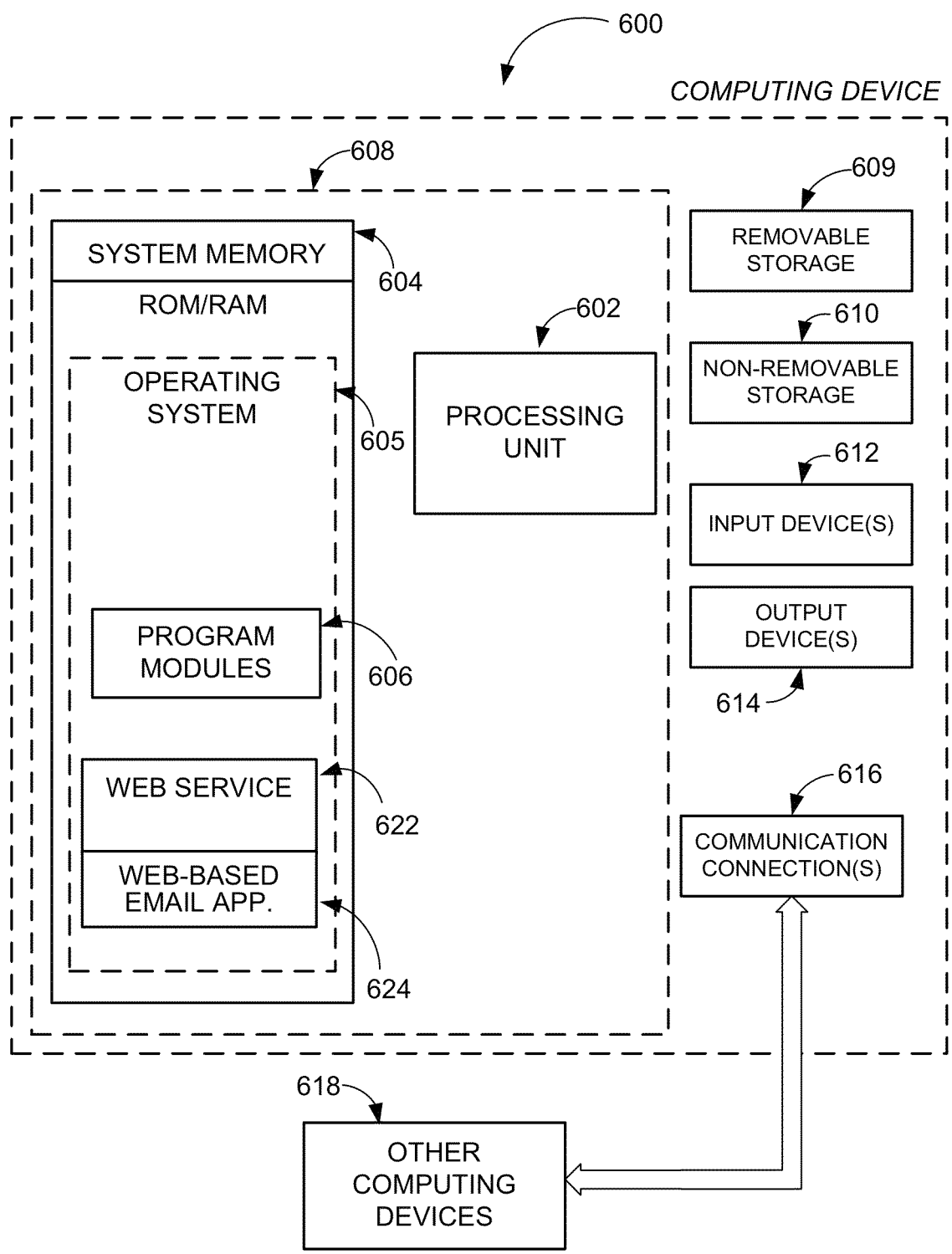
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, web service 622, and web-based email application 624.

Web service 622 may provide, among other services, email services facilitating exchange of emails among client applications. Web service 622 may include one or more applications for providing the web-based services such as web-based email application 624. Web-based email application 624 may enable synchronization of conversations within the email system by employing a conversation state at each client and a web service command for conversation synchronization. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
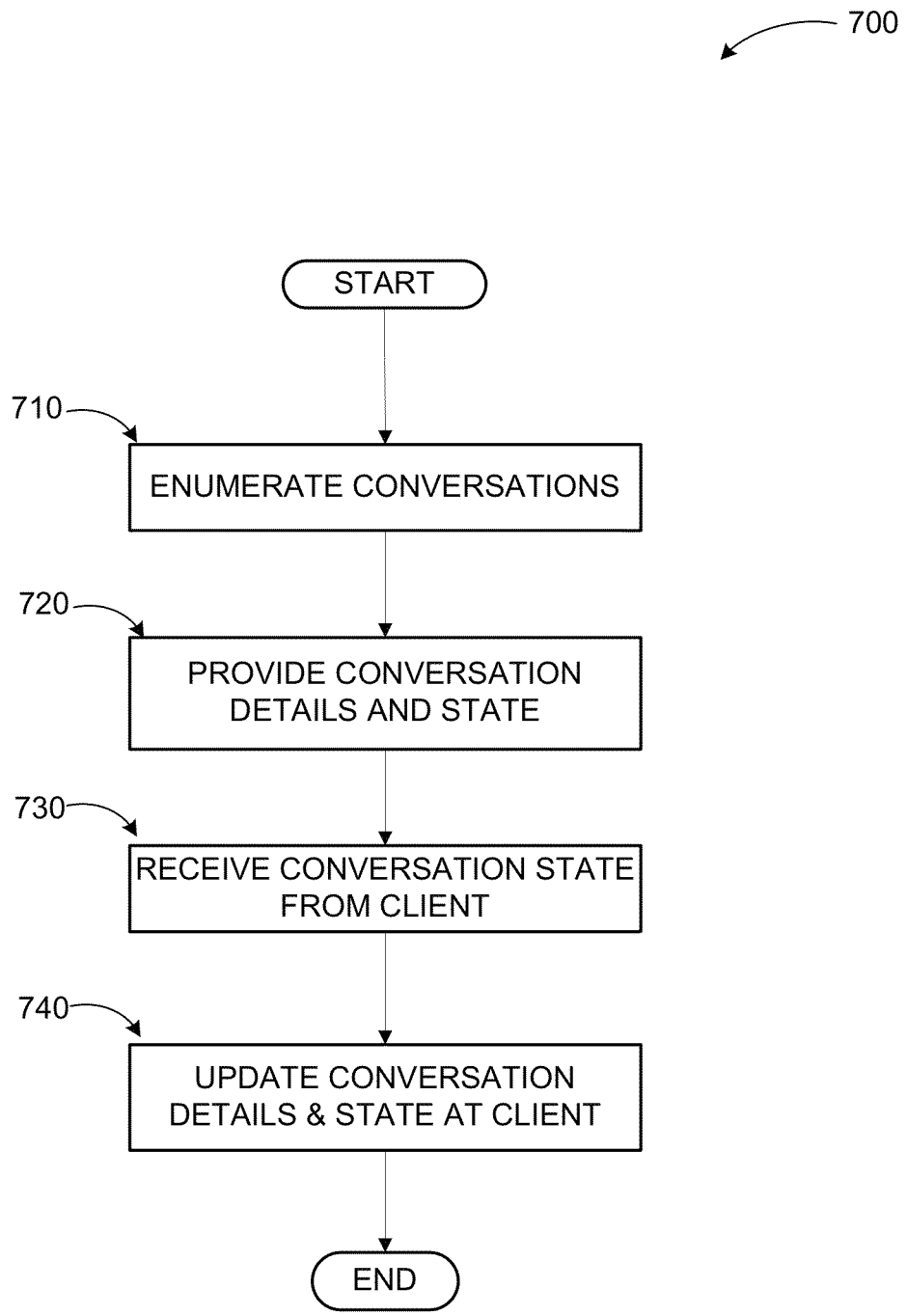
FIG. 7 illustrates a logic flow diagram for a process of synchronizing conversation structures in web-based email systems according to embodiments.

FIG. 7 illustrates a logic flow diagram for process 700 of synchronizing conversation structures in web-based email systems according to embodiments. Process 700 may be implemented by any web-based email service or application.

Process 700 may begin with operation 710, where conversations may be enumerated. New clients or clients joining the service after a prolonged absence may be provided all conversation information such as emails and attributes associated with the conversation(s). At operation 720, conversation details and state may be provided to a client. Conversations may be identified by a conversation identifier, a name, or similar suitable attribute.

At operation 730, a conversation state may be received from a client. The web-based email service may determine conversation details to be provided to the client based on the conversation state of the client and provide those to the client at operation 740. The service may at the same time update the state of the client or the client may update its state locally.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. A web-based email service with conversation synchronization may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for synchronizing email conversations, the method comprising:
receiving a conversation synchronization request from a client application at a web service, wherein the conversation synchronization request includes at least one from a set of: a list of folder identifiers to synchronize, a time window to synchronize, a number of changes to return, and a synchronization state blob;
calling an internal application programming interface (API) on a conversation view of a folder to determine a list of conversations that have changed;
transmitting a response that includes identifiers of changed conversations to the client application;
for each changed conversation receiving a request from the client application along with a conversation state;
comparing conversation data for each changed conversation to the conversation view of a folder based on the received conversation states;
returning item properties and bodies of messages in the changed conversations to the client application; and
causing the client application to iterate through added conversations, changed conversations, and deleted conversations for which a last received time is past the time window to synchronize by:
finding a deleted conversation in a local database using the message identifier (MID);
removing any folder statistics for a folder that includes the deleted conversation; and
adding a conversation identifier for the deleted conversation to a list of conversations in the request to the web service.

2. The method of claim 1, wherein the client application is a web-based email application.

3. The method of claim 1, wherein causing the client application to iterate through the added and changed conversations further comprises:
finding one of an added and a changed conversation in a local database using a received conversation identifier;
updating global statistics;
updating folder statistics;
removing any folder statistics for folders that are not within a list of transmitted folder identifiers (FIDS); and
adding the conversation identifier to a list of conversations to include in the request to the web service.

4. The method of claim 1, further comprising:
including in the response transmitted to the client application at least one from a set of: an updated synchronization state blob, a flag indicating if there are more changes, changed conversations and added conversations that participate in at least one of the requested folders, and deleted conversations.

5. The method of claim 4, wherein data for changed conversations and added conversations includes at least one from a set of: a conversation identifier, the MID of a conversation object, aggregate statistics for at least a portion of the folders, and aggregate global statistics.

6. The method of claim 4, wherein the deleted conversations include a MID of a conversation object for each deleted conversation and an identifier of a folder from which a message is being deleted.

7. The method of claim 4, further comprising:
separating the synchronization state blob into a synchronization state for each folder to synchronize;
storing a current time as a last received time (LTR);
for each folder to synchronize:
if the LTR is past a requested time window to synchronize, skipping to a next folder, else
querying for conversations with a time window that is less than the LRT; and when an LRT is reached that is greater than the requested time window to synchronize, storing a lowest LRT that has been detected in the synchronization state.

8. The method of claim 7, further comprising:
if the synchronization state for a folder does not exist, receiving a synchronization state from the internal API and storing a current time as the LRT for the folder; else enumerating changes by calling the internal API on the requested folder;
skipping any change where a folder LRT is before the requested time window to synchronize;
for added and changed conversations, receiving a conversation identifier, an MID, and folder and global statistics; and
for deleted conversations, receiving a MID of a conversation object for each deleted conversation.

9. The method of claim 1, wherein the request from the client application includes for each conversation at least one from a set of: a conversation identifier, a conversation state of a last conversation synchronization, and a list comprising: item identifiers, change keys, and a read flag change key for each message in the conversation.

10. A system for synchronizing email conversations, the system comprising:
a first server comprising:
a memory; and
a processor executing a web-based email application, wherein the processor of the first server is configured to:
transmit a conversation synchronization request with at least one from a set of: a synchronization state blob, a list of folder to be synchronized, and a time window for synchronization;
receive a list of conversation identifiers; and
for each received conversation identifier, transmit a request that includes a last conversation state; and
a second server comprising:
a memory; and
a processor executing a web service, wherein the processor of the second server is configured to:
call a change tracking module of a web service data store to determine a list of changed conversations;
transmit the list of conversation identifiers to the web-based email application;
read an item list from a conversation view of a folder at the web service data store;
compare item data based on the received last conversation states;
return to the web-based email application item properties and bodies of messages that are determined to be changed; and
cause the web-based email application to iterate through added conversations, changed conversations, and deleted conversations for which a last received time is past the time window to synchronize by:
finding a deleted conversation in a local database using the message identifier (MID);
removing any folder statistics for a folder that includes the deleted conversation; and
adding a conversation identifier for the deleted conversation to a list of conversations in the request to the web service.

11. The system of claim 10, wherein the processor of the second server is further configured to:
return folder-specific information and global information associated with each conversation, as well as aggregated data to the web-based email application.

12. The system of claim 11, wherein the folder-specific information and global information includes at least one from a set of: read emails, unread emails, flagged emails, responded emails for each changed folder and globally.

13. The system of claim 11, wherein the aggregated data includes at least one from a set of: subjects, recipients, flags, importance levels, and categories for each changed email.

14. The system of claim 11, wherein the processor of the second server is further configured to query the web service data store by calling the change tracking module through an internal API and a messaging API (MAPI).

15. A computer-readable memory device with instructions stored thereon for synchronizing email conversations, the instructions comprising:
receiving from a web-based email application a conversation synchronization request with at least one from a set of: a synchronization state blob, a list of folder to be synchronized, and a time window for synchronization;
calling a change tracking module of a web service data store to determine a list of changed conversations;
transmitting a list of conversation identifiers for changed conversations to the web-based email application;
for each received conversation identifier, receiving a request that includes a last conversation state at the web-based email application;
reading an item list from a conversation view of a folder at the web service data store;
comparing item data based on the received last conversation states; and
returning to the web-based email application item properties and bodies of messages that are determined to be changed; and
causing the web-based email application to iterate through added conversations, changed conversations, and deleted conversations for which a last received time is past the time window to synchronize by:
finding a deleted conversation in a local database using the message identifier (MID);
removing any folder statistics for a folder that includes the deleted conversation; and
adding a conversation identifier for the deleted conversation to a list of conversations in the request.

16. The computer-readable memory device of claim 15, wherein a call to the change tracking module of the web service data store includes at least one from a set of: a last synchronization state, a folder identifier, a new flag that indicates a conversation mode, a new-to-old flag indicating an order of items to be processed, and a list of extra properties to be returned for additions and changes.

17. The computer-readable memory device of claim 15, wherein the change tracking module of the web service data store enumerates changes to any conversation object with at least one message in a folder to be synchronized and a synchronization state per folder is stored at the web service data store.

* * * * *